(12) United States Patent
Zagni et al.

(10) Patent No.: US 7,641,148 B2
(45) Date of Patent: Jan. 5, 2010

(54) SONOBUOY LOADING METHOD

(75) Inventors: Julian Patrick Zagni, Martock (GB); Philip James Withers, Somerset (GB)

(73) Assignee: Honeywell International Inc., Morristown, NJ (US)

( * ) Notice: Subject to any disclaimer, the term of this patent is extended or adjusted under 35 U.S.C. 154(b) by 460 days.

(21) Appl. No.: 11/395,563

(22) Filed: Mar. 31, 2006

(65) Prior Publication Data

US 2006/0237592 A1    Oct. 26, 2006

(30) Foreign Application Priority Data

Apr. 21, 2005    (GB) .................... 0508020.5

(51) Int. Cl.
*B64D 1/08* (2006.01)
(52) U.S. Cl. .................. 244/137.1; 244/137.4
(58) Field of Classification Search ............... 244/136, 244/137.1, 137.3, 137.4, 1 R; 89/1.58, 1.59
See application file for complete search history.

(56) References Cited

U.S. PATENT DOCUMENTS

| | | | | |
|---|---|---|---|---|
| 1,172,542 A * | 2/1916 | McMullen | .................. | 89/1.52 |
| 2,707,904 A | 5/1955 | Strunk | | |
| 2,882,795 A * | 4/1959 | Bergner et al. | .................. | 89/1.8 |
| 2,968,410 A * | 1/1961 | Hamilton et al. | ............ | 414/783 |
| 3,430,533 A * | 3/1969 | Kifor et al. | .................. | 89/1.51 |
| 3,511,457 A * | 5/1970 | Pogue | ...................... | 244/137.3 |
| 4,141,274 A * | 2/1979 | Gerber | ........................ | 89/1.51 |
| 4,397,433 A * | 8/1983 | Guitaut et al. | ........... | 244/137.4 |
| 4,962,798 A | 10/1990 | Ferraro et al. | | |
| 4,974,796 A | 12/1990 | Carr et al. | | |
| 5,052,270 A * | 10/1991 | Travor et al. | ................. | 89/1.51 |
| 5,054,364 A * | 10/1991 | Dragonuk et al. | ............ | 89/1.51 |
| 5,070,760 A * | 12/1991 | Marshall et al. | .............. | 89/1.51 |
| 5,076,134 A * | 12/1991 | Marshall et al. | .............. | 89/1.51 |
| 5,222,996 A * | 6/1993 | Marshall et al. | .......... | 244/137.4 |
| 5,253,605 A * | 10/1993 | Collins | ........................ | 114/259 |
| 5,359,917 A * | 11/1994 | Travor | ........................ | 89/1.51 |
| 5,411,225 A * | 5/1995 | Lannon et al. | ........... | 244/137.1 |
| 6,498,767 B2 * | 12/2002 | Carreiro | ........................ | 367/4 |
| 6,679,454 B2 * | 1/2004 | Olsen et al. | ............... | 244/137.1 |
| 6,758,441 B2 * | 7/2004 | Jakubowski et al. | ...... | 244/137.4 |
| 6,764,048 B2 * | 7/2004 | Jakubowski et al. | ...... | 244/137.4 |
| 6,776,375 B1 * | 8/2004 | Engelhardt et al. | ........ | 244/173.3 |
| 6,796,530 B2 * | 9/2004 | Jakubowski, Jr. et al. | | 244/137.4 |
| 6,811,123 B1 * | 11/2004 | Foster et al. | .............. | 244/137.4 |
| 7,093,802 B2 * | 8/2006 | Pitzer et al. | ............... | 244/137.1 |

\* cited by examiner

*Primary Examiner*—Michael R Mansen
*Assistant Examiner*—Joseph W Sanderson
(74) *Attorney, Agent, or Firm*—Oral Caglar, Esq.

(57) ABSTRACT

The present invention provides a method for loading equipment into a deployment apparatus and particularly for loading equipment in an aircraft for deployment. The method includes steps for moving a container towards the deployment apparatus in a non-upright orientation, engaging the container with the deployment apparatus, and then moving the container towards an upright orientation.

18 Claims, 3 Drawing Sheets

SONOBUOY LOADING METHOD

BACKGROUND OF THE INVENTION

This invention generally relates to equipment deployment systems and methods for aircraft and more particularly to systems and methods for loading equipment in an aircraft and deploying therefrom.

Successful deployment of equipment from a flying aircraft depends upon correct loading of the equipment in a deployment apparatus of the aircraft. Typically, such equipment is provided in an elongate, bulky, and heavy container. Conventionally, the deployment of equipment provided in a container requires the operator to lift the container, containing the equipment, into the deployment apparatus from beneath the aircraft, i.e., requires the container to be raised manually or automatically by an operator when generally vertical or upright, through an opening in the aircraft fuselage, from below the opening. Thus, such fitments, at time, can be difficult to achieve successfully, because such systems do not provide for flexibility of loading and deploying of the equipment.

Attempts have been made to overcome the difficulties inherent in the conventional approaches. For example, U.S. Pat. No. 2,707,904 discloses a sonobuoy dispenser which include a support member being provided with a central opening, a plurality of sonobuoy launchers carried by the support member, means adapted to transport each of the sonobuoy launchers in the direction of the central opening to dispense the sonobuoy therethrough, and means to return the sonobuoy launchers to a loading position. This system has complex structure and operational indices and does not provide an easy loading and deployment of equipment.

U.S. Pat. No. 4,974,796 discloses a sonobuoy dispenser including a rotatable tubular cylinder having a plurality of adjustable sonobuoy support members longitudinally of its external surface. The tubular cylinder is rotated and indexed by a power source and a Geneva mechanism, which is controlled by a fiber optic switch member and an electronics control circuit for selectively releasing the sonobuoys. This system also has complex structure and operational indices and falls short in providing a convenient approach for loading and deploying of equipment.

U.S. Pat. No. 4,962,798 discloses a buoy deployment system for an aircraft which includes a multi-store gravity launching system which allows for discharge of different lengths and types of buoys. This patent also discloses a rotatable storage carousel including a plurality of semi-cylindrical tube section/latch assemblies, sized to restrain a plurality of buoys, which form storage stations on the carousel. This system also has complex structure and operational indices.

As can be seen, there is a need for automatically loading equipment such as a sonobuoy in an aircraft and deploying it therefrom in a manner which is not only quick, easy, and effective, but safe as well.

SUMMARY OF THE INVENTION

One aspect of the present invention is a system for loading and deploying equipment from an aircraft, the system comprising: a container, the container having a first end, a second end disposed away from the first end and a piston which prior to deployment, is located towards the first end of the container; a deployment apparatus operative to deploy the equipment from the aircraft, the deployment apparatus having: a mounting device engageable with the first end of the container to mount the container in an vertical orientation; a receiving structure for receiving the second end of the container in a non-vertical orientation, the receiving structure having an elevating device which, when operated, subsequent to the first end of the container being moved towards the mounting device, raises the container to a position to permit the mounting device to engage the first end of the container; and a source of pressurized gas and a mechanism to apply the pressurized gas to the interior of the container for moving the piston axially relative to the container towards the second end for urging the equipment to be deployed from the second end of the container.

Another aspect is system for loading and deploying equipment, comprising: a container containing the equipment, the container having a first end, a second end disposed away from the first end and a piston which prior to deployment, is located towards the first end of the container; a deployment apparatus operative to deploy the equipment from the aircraft, the deployment apparatus comprising a mounting device engageable with the first end of the container to mount the container in an vertical orientation, a receiving structure for receiving the second end of the container in a non-vertical orientation, the receiving structure having an elevating device which, when operated, subsequent to the first end of the container being displaced towards the mounting device, raises the container to a position to permit the mounting device to engage the first end of the container, and a source of pressurized gas and a mechanism to apply the pressurized gas to the interior of the container for moving the piston towards the second end for urging the equipment to be deployed from the second end of the container; wherein the system is disposed in a sealed envelope within a pressurized region of the aircraft; and wherein an interior of the sealed envelope is pressure isolated from the pressurized region of the aircraft.

A third aspect of the present invention is a method for loading a container containing equipment in a deployment apparatus and deploying therefrom, the container having a first end, a second end disposed away from the first end and a piston which prior to deployment, is located towards the first end of the container, the method comprising moving the container towards the deployment apparatus in a non-vertical orientation; engaging a second end of the container with a receiving structure of the deployment apparatus moving the first end of the container upwardly towards a mounting device of the deployment apparatus in an vertical orientation, with the second end engaged with the receiving structure; operating an elevating device of the receiving structure to raise the container to a position to permit the mounting device to be engaged with the first end of the container, thereby loading the container in the deployment apparatus; and applying pressurized gas to an interior of the container for moving the piston axially relative with respect to the container towards the second end for urging the equipment to be deployed from the second end of the container, thereby deploying the equipment from the deployment apparatus.

These and other features, aspects and advantages of the present invention will become better understood with reference to the following drawings, description and claims.

DETAILED DESCRIPTION OF THE INVENTION

Figure 1:
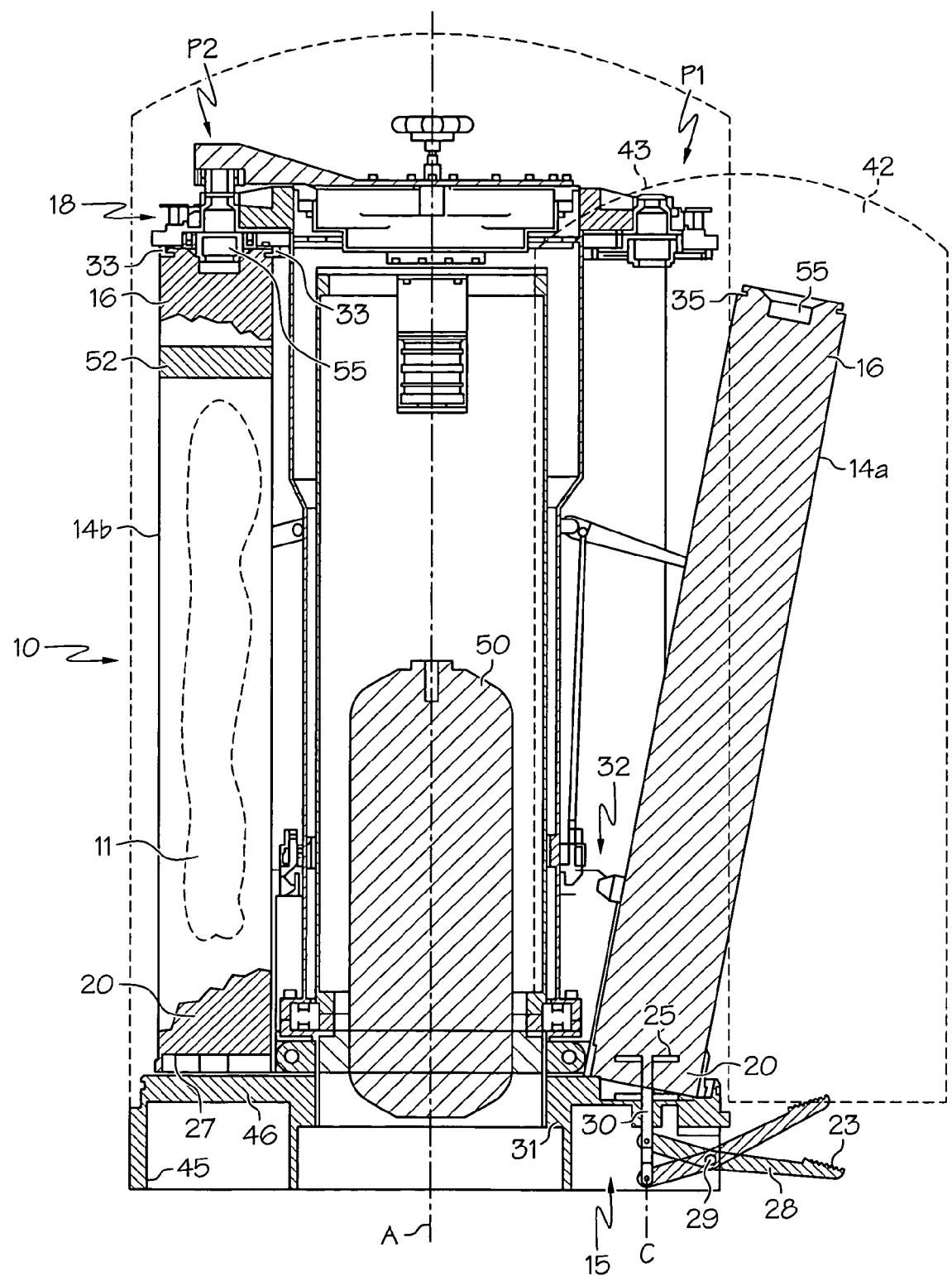
FIG. 1 is a partly cross-sectional, side view of a system for loading and deploying an equipment form a flying aircraft, according to an exemplary embodiment of the present disclosure.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, this invention relates to a method and system for the loading a container containing equipment and more particularly to a method and system of loading such a container in a deployment apparatus which is operative to deploy the equipment from an aircraft. The subject matter of the priority document, UK Patent Application number 0508020.5, is herein incorporated in its entirety by reference.

Typically such equipment is provided in a container which is generally elongate, bulky and heavy. In one example of a typical deployment apparatus, this requires the container to be raised manually by operatives when generally upright or vertical, through an opening in the aircraft fuselage, from below the opening. This can be difficult to achieve.

According to a first aspect of the invention there is provided a system and method of loading a container containing an item of equipment in a deployment apparatus which is operative to deploy the equipment from a flying aircraft, in which the container has a first end and a second end, the deployment apparatus including a mounting device engageable with the first end of the container, to mount the container in a generally upright or vertical depending condition with the second end being below the first end, the system and method including moving the container towards the deployment apparatus in a non-upright or non-vertical orientation, engaging the second end of the container with a receiving structure of the deployment apparatus, and with the second end engaged with the receiving structure, moving the first end of the container upwardly towards the mounting device towards a generally vertical or upright orientation, and then operating an elevating device of the receiving structure to raise the container to a position to permit the mounting device to be engaged with the first end of the container.

Thus by the system and by performing the method of the present invention, there may be no need for operatives to lift the container containing the equipment into the deployment apparatus up into the deployment apparatus from beneath the aircraft, but the container may be more readily received into the fuselage of the aircraft in the non-upright or non-vertical orientation and loaded into the deployment apparatus.

Typically, the elevating device may be manually operated, for example by an operative's foot, the device conveniently including a lever mechanism which may extend from an operating position, to below a floor of the deployment apparatus, and upwardly though the floor into the receiving structure.

The deployment apparatus may include or be contained within a sealed envelope within a pressurized region of the aircraft, such as a cabin, so that when the item of equipment is deployed from the aircraft, typically though an opening in a fuselage thereof, pressure is not lost from the pressurized region. The operating position from which the lever of the elevating device extends is, in one exemplary embodiment, external to the sealed envelope. A pressure seal may be disposed between the floor of the deployment apparatus and the lever mechanism to prevent or reduce pressure loss from the pressurized region during deployment of the equipment.

The mounting device and the first end of the container may automatically engage when the elevating device is operated to raise the container, but alternatively, the container and the mounting device may include respective first and second inter-engaging formations which are inter-engageable as the raised container and mounting device are relatively rotated, to mount the container in the depending condition.

The deployment apparatus may be of the kind in which the container containing the equipment is moveable from a position in which the container is received in the apparatus to a loaded position ready for deployment of the equipment, in which case the system or method may include, after receiving the container and engaging the mounting device with the first end of the container, moving the container to the loaded position ready for deployment.

Thus the deployment apparatus may receive a plurality of containers with equipment, each engaged with a respective mounting device, the containers being moveable severally from the position in which they are each received in the deployment apparatus, to the loaded position ready for deployment. Typically the containers are each moveable on a carousel including the respective mounting devices, from the receiving position to the loaded position.

Where there is provided a sealed envelope, this may include a closure at the receiving position which is openeable to permit the container or containers to be received in the apparatus, and which is closeable to seal the envelope.

If desired, a container may be deployed from the aircraft with the equipment it contains, for example by releasing the engagement of the mounting device and the first end of the container when the container is at the loaded position. However in one embodiment of the invention, the equipment may be deployed from its container, in which case the container from which the equipment has been deployed, would require removal from the apparatus after use, so that this may be replaced with a container containing further equipment to be deployed.

In one example, the container may include a piston which prior to deployment, is located at or towards the first end of the container, the piston being moveable axially of the container towards the second end, to urge the equipment to be deployed form the second end of the container. For example, pressurized gas, e.g. air, may be introduced into the container at the first end this to move the piston. A storage vessel for the pressurized gas may be located within the sealed envelope where provided. Thus the system of the present invention may include the components capable of carrying out the method of engaging the first end of the container with the mounting device, making a connection between the inside of the container and a source of pressurized gas, via a valve.

At the second end of the container, there may be a capping, which may require to be removed from the first end of the container prior to deploying the equipment from the container, but in a preferred embodiment, the capping is frangible and thus becomes at least partially detached from the remainder of the container by the equipment being urged into contact therewith by the piston. The capping may be a frangible capping capable of being at least partially detached from a remainder of the container by the equipment being urged into contact therewith by the piston.

According to a second aspect of the invention there is provided a system and method of deploying equipment from a pressurized region of a flying aircraft subsequent to loading a container containing the equipment into a deployment apparatus in the aircraft, the container having a first end and a second end, and including a piston which prior to deployment, is located at or towards the first end of the container, the deployment apparatus including a mounting device engageable with the first end of the container, to mount the container in a generally vertical or upright depending condition with the second end being below the first end, the method including providing the deployment apparatus within a sealed envelope the interior of which is pressure isolated from the pressurized region, applying to the interior of the container pressurized air to move the piston axially of the container towards the second end to urge the equipment to be deployed from the second end of the container.

According to a third aspect of the invention there is provided in combination, a deployment apparatus an a container containing equipment to be deployed from a flying aircraft, the container having a first end and a second end, the deployment apparatus including a mounting device engageable with the first end of the container, to mount the container in a generally vertical or upright depending condition with the second end being below the first end, the deployment apparatus including a receiving structure for receiving a second end of the container with the container in a non-vertical orientation, and the receiving structure including a elevating device, which, when operated, subsequent to the first end of the container being moved upwardly towards the mounting device, raises the container to a position to permit the mounting device to engage the first end of the container.

According to a fourth aspect of the present invention there is provided an aircraft including in combination, a deployment apparatus and a container containing equipment to be deployed from a pressurized region of the flying aircraft, the container having a first end and a second end and including a piston which prior to deployment, is located at or towards the first end of the container, the deployment apparatus including a mounting device engageable with the first end of the container, to mount the container in a generally vertical or upright depending condition with the second end being below the first end, and there being a sealed envelope in which the deployment apparatus and container are pressurized air to the interior of the container to move the piston axially of the container towards the second end to urge the equipment to be deployed from the second end of the container.

Referring to the drawings, there is shown a deployment apparatus 10 for deploying from a flying aircraft, equipment, such as one or more sonobuoys 11.

The sonobuoys or other items of equipment 11, may be provided in respective containers 14a, 14b, which may be elongate and generally cylindrical in this example. The containers 14 typically may be hollow plastic pipes, but the combined container 14 and equipment 11 contained therein, may be heavy and difficult manually to handle.

In the present example, a plurality of containers 14 may be received by the deployment apparatus 10, and each may be moveable from a receiving position P1 in which the container can be received in the deployment apparatus 10, for example the position where container 14a is indicated, and a loaded position P2, indicated where container 14b is located, form where the equipment 11 may be deployed from the apparatus 14, downwardly through an opening in the aircraft's fuselage.

In use, the or each container 14 in the deployment apparatus 10, may be in a generally vertical or upright condition, with a first end 16 of the container 14 in engagement with a respective mounting device 18, whereby the container 14 depends from its mounting device 18.

In the present example, the deployment apparatus 10 may have a carousel so that eight containers 14 may be received in the apparatus 10 and mounted by respective mounting devices 18 in depending generally vertical or upright conditions, in a circular array, the carousel including the or each mounting device 18, and being rotatable about a generally vertical or upright axis A of rotation, so that the containers 13 may each severally be brought to the position P2 occupied in the drawing by container 14b, from where the equipment 11 contained in the respective container 14 may be deployed.

The deployment apparatus 10 includes a container receiving structure 15 located at the receiving position P1 occupied by container 14a in the drawing. The receiving structure 15 includes a container receiving part 21 which surrounds an opening 17, the receiving structure 15 further including an upwardly extending container support part 19 of part circular configuration, which surrounds part of the container receiving part 21. In accordance with the invention, a container 14 may be received in the deployment apparatus 10 in a non-upright or non-vertical orientation, by engaging a second end 20 of the container 14 axially opposite to the first end 16, with the receiving structure 15. Location of the second end 20 of the container 14 with respect to the container receiving part 21 is facilitated by the upwardly extending container support part 19.

With the second end 20 of the container 14 thus supported and located, the first end 16 of the container 14 may be upwardly moved towards the mounting device 18. In FIG. 1, container 14a is shown in a position between the non-vertical orientation in which the second end 20 is engaged with the receiving structure 15, and a fully vertical or upright orientation, where the first end 16 of the container 14a will be positioned in this example, immediately below the mounting device 18.

The container 14a may then be raised to bring the mounting device 18 and first end 16 of the container 14a to positions where they may be brought into engagement.

In accordance with the invention, the receiving structure 15 can include an elevating device 22. This includes in this example, a foot engageable pedal 23, which acts through a lever mechanism 24, to raise or lower an elevating member 25 which correspondingly rises and falls through the opening 17 of the receiving structure 15, to engage with a circular capping 27 at the first end 20 of the container 14a. The lever mechanism 24 can include a first part 28 which is pivoted about a generally horizontal axle 29, and a second part 30 which is pivoted to the first part for relative movement about a generally horizontal axis C, and extends generally vertically to the elevating member 25. The second part 30 of the lever 24 of the elevating device 22 passes through a floor 31 of the deployment apparatus 10, through a pressure seal, for a purpose hereinafter explained. In FIG. 1, the lever mechanism 24 is shown in both an initial position prior to raising the container 14a, and an actuated position in which the pedal 23 is depressed to raise the container 14a.

Thus, when the container 14a is in a generally vertical or upright orientation at the receiving position P1, the container 14a may be raised by depressing the pedal 23 of the elevating device 22 to bring the first end 16 of the container 14a and the mounting device 18 to relative positions where they are engageable. When they are engaged, the pedal 23 may, with spring assistance as required, be released, and the elevating member 25 will then disengage the capping 27, leaving the container 14a suspended from the mounting device 18 depending in a generally vertical or upright condition, clear of the container receiving part 21.

If desired, when not required, the pedal 23 and first lever part 28 at least of the lever mechanism 24 may be moved, e.g. when the deployment apparatus 10 is fully loaded, to a clear position below the floor 31 of the apparatus 10.

As illustrated in the drawing, if desired, a latch arrangement 32 may be provided to constrain the container 14 from lateral swinging movement, which latch 32 may automatically engage as the container 14a is moved towards the generally vertical or upright, or may be manually engaged, as may be required.

The container 14a in this example, has at the first end 16 thereof, first inter-engaging formations 33 provided by a part-circumferentially extending grooves. In the present example, the grooves 35 extend around a part or parts only of the periphery of the container. The mounting device 18 includes a plurality second inter-engaging formations 34 which are adapted to be received in the grooves 35 to mount the container 14a, when the inter-engaging formations 33, 35 are relatively rotated, in the manner of a bayonet fitting. In the present example, once the container 14a is raised, the second inter-engaging formations 33 and 34 into inter-engagement. The second inter-engaging formations 34 may be rotated manually or may be driven by, for example, pneumatics, electrics or another power source.

In another example, the second formations 34 may be spring biased, and may be arranged automatically to snap inter-engage in a groove 35 as the container 14a may be raised by the elevating device 22, or may be manually engageable, or moved by a solenoid actuator or the like as required.

In each case, when received in the deployment apparatus 10, the container 14a can be mounted at the first end 16 thereof by the mounting device 18. By rotating the carousel, the container 14a may be moved, about rotational axis A, to the loaded position P2 at which the equipment 11 may be deployed. In one example, the carousel may be rotated by an electric motor (not illustrated) acting through a suitable transmission, but may be rotated manually, or otherwise as required.

It will be appreciated that the elevating device 22 of the receiving structure 15 will remain at the receiving position P1 for use in raising any next container 14 received in the deployment apparatus 10, but that the container receiving part 21 and upwardly extending container support part 19 will be moved by the carousel to the receiving position P1, for receiving the second end 20 of the next container 14.

It will be appreciated that particularly when deploying equipment 11 from an aircraft flying at height, because it is necessary to provide an opening in the aircraft's fuselage for the equipment 11 to pass through, where the deployment apparatus 10 is provided in a pressurized cabin or other region, pressure could be lost through the fuselage opening.

To avoid this, the deployment apparatus 10 is provided in an envelope 40 the outline of which is indicated by dotted lines at FIG. 1, which envelope 40 may be sealed to isolate the interior thereof from the cabin or other pressurized region.

Figure 2:
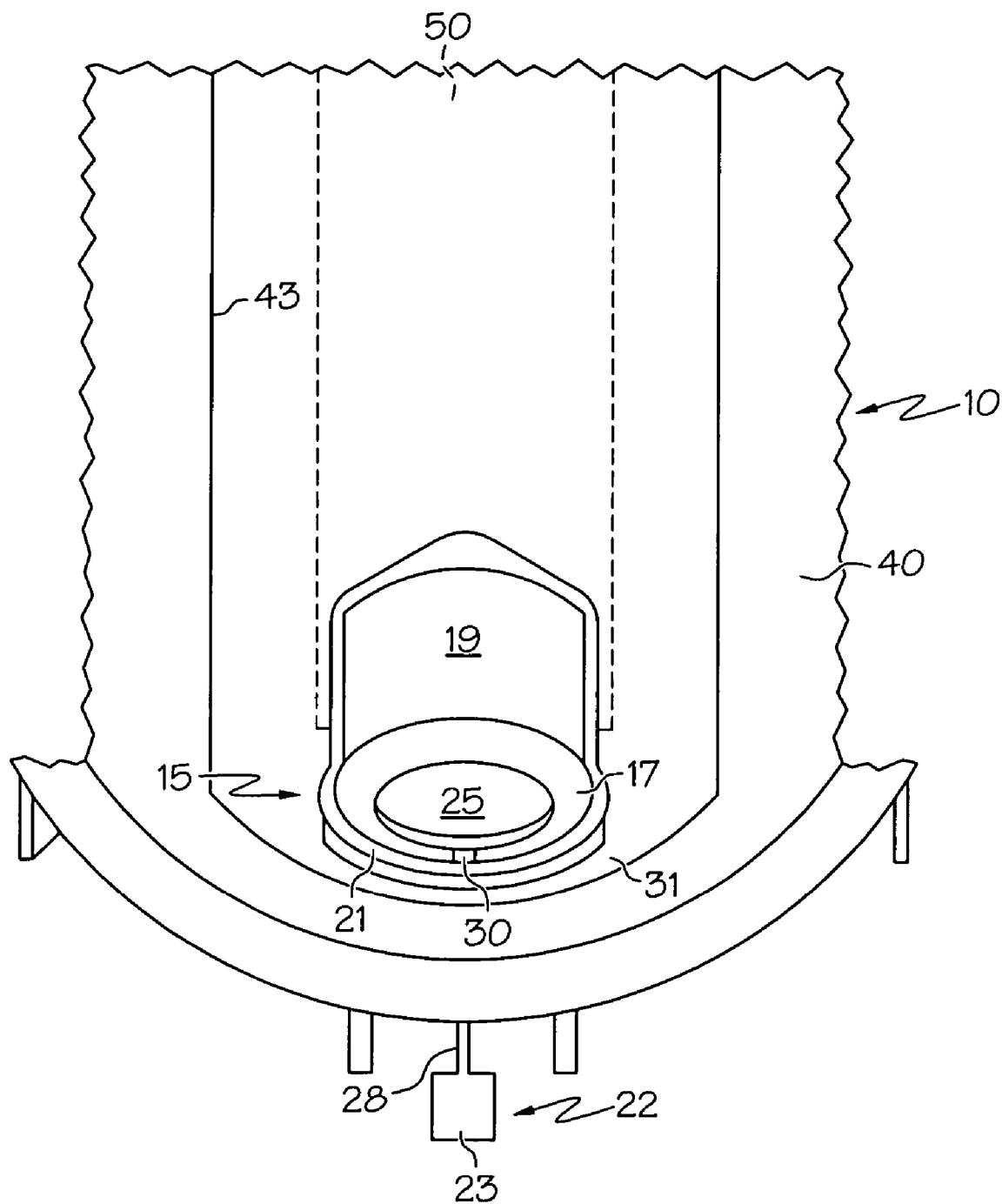
FIG. 2 is a fragmentary illustrative view of the system for loading and deploying an equipment form a flying aircraft of FIG. 1.

At the receiving position P1, there is provided a closure 42 which in the present example is a door (not shown in FIG. 2), which may be closed over or in a receiving opening 43 though which the containers 14 are received in the deployment apparatus 10, to seal the envelope 40 when the or all of the containers 14 to be loaded, are received by the apparatus 10. The closure 42 may be hinged or slid open and closed, or may be otherwise removable and replaceable with respect to the opening 43.

At the loaded position P2 from where the equipment 11 can be deployed, the floor 31 of the deployment apparatus 10 has an opening provided in the aircraft's fuselage. The opening 45 which can be aligned with a corresponding opening provided in the aircraft's fuselage. The opening 45 of the deployment apparatus 10 may be closed by a closure plate 46 which may be moved clear of the opening 45 when it is desired to deploy equipment 11, or if desired, the opening 45 of the fuselage may be closeable until it is desired to deploy equipment 11, or indeed, both openings could be closeable or permanently open. In the latter case, the pressure sealing with the cabin or other pressurized region in which the deployment apparatus 10 is provided, may be achieved solely by the envelope 40.

Whereas the whole container 14b and contained equipment 11 could be deployed form the deployment apparatus 10, e.g. by releasing the mounting device 18 at the loaded position P2, in this example, the equipment 11 can be deployed from the container 14b, and the empty container 14b may be removable from the deployment apparatus 10 e.g. when it is desired to replenish the apparatus 10 with equipment to be deployed, by moving the empty containers 14 severally to the receiving position P1. This replenishment may be achieved whilst the aircraft continues to fly (provided that the opening 45 through the floor 31 and/or through the fuselage are closeable) or on the ground as required.

The deployment apparatus 10 shown, includes a storage vessel 50 for storing pressurized gas, preferably compressed air. The vessel 50 may be connected by conduits and valves (not shown) to each of the mounting devices 18, and when a container 14 is raised by the operation of the elevating device 22 into its generally vertical or upright depending condition, a connection can be made via a gas inlet 55 to the interior of the container 14 to the vessel or so of pressurized gas, via a deployment control valve (not illustrated) of the mounting device 16.

Within each container 14 there may be provided a piston 52 which, prior to deployment, can be positioned at or adjacent to the first end 16 of the container 14, with the equipment 11 between the piston 52 and the capping 27 at the second end 20.

When it is desired to deploy the equipment 11 in the container 14b at the loaded position P2, the deployment control valve of the mounting device at the loaded position P2 is opened, whereby pressurized gas is communicated to the container 14b via the gas inlet 55 of the container 14b, to act upon the piston 52 and drive the piston 52 towards the second end 20 of the container 14b. The piston 52 will thus urge the equipment 11 from the container 14b.

In one example, some means may be provided to remove the capping 27 at the second end 20 of the container 14b to permit the equipment 11 to be moved through the opening 45 in the deployment apparatus 10 floor 31, but in a preferred arrangement, the capping 27, thereby to allow the equipment 11 to be deployed.

After its equipment 11 had been deployed, the empty or equipmentless container 14b may then moved away from the loaded position P2 on the carousel, towards the receiving position P1 from where the spent container 14 may then be removed from the apparatus 10 (when closure 42 is opened), using the elevating device 25 if required, in a reverse sequence to that used for receiving containers 14 containing equipment 11.

Various modifications may be made without departing from the scope of the invention.

For example, the storage vessel 50 for pressurized gas need not be provided in the deployment apparatus 10, but may be stowed elsewhere, or a supply of pressurized gas to deploy the equipment 11 as described my be obtained from another source, such as from pressurized air derived from a gas turbine engine powering the aircraft.

Instead of a plurality of containers 14 being provided in a circular array on a carousel, a plurality of containers 14 may otherwise be provided, e.g. in a linear or other array, which permits containers 14 severally to be moved to a loaded position from where equipment 11 may be deployed, or a single container 14 only may be provided, in which case the receiving and loaded positions P1, P2 may be at the same position.

A sealed envelope 40 need not be provided in an aircraft which only flies at low heights, such as helicopter, where loss of pressurization issues do not arise.

Alternatively, other arrangements for preserving pressure within a pressurized region of an aircraft during deployment of equipment 11 may be provided.

The receiving structure 15 described is only exemplary. Other structures for supporting and locating the second end 20 of a container 14 whilst the container 14 is moved to a generally vertical or upright orientation may be used. The lever mechanism 24 of the elevating device 22 need not include the two lever parts 28, 30 as described, but may include a single lever part only, although the arrangement described is preferred because the second lever part 30 is moved generally vertically when the pedal 23 is depressed, making pressure sealing with the floor 31 more straightforward.

In another arrangement, in place of the foot operated lever mechanism 24, another preferably manually, but possibly powered elevating device 22 may be used. However the foot operated elevating device 22 described, has been found to enable significant mechanical advantage to be realized, enough easily to arise a container 14 and its equipment 11 weighing 40 pounds or more.

In another example, instead of providing for the equipment 11 to be deployed using pressurized gas acting on a piston 52, the piston 52 may be moved to urge the equipment from the container 14b by an explosive charge, or the equipment 11 may be allowed to pass from the container 11 under gravity.

Figure 3:
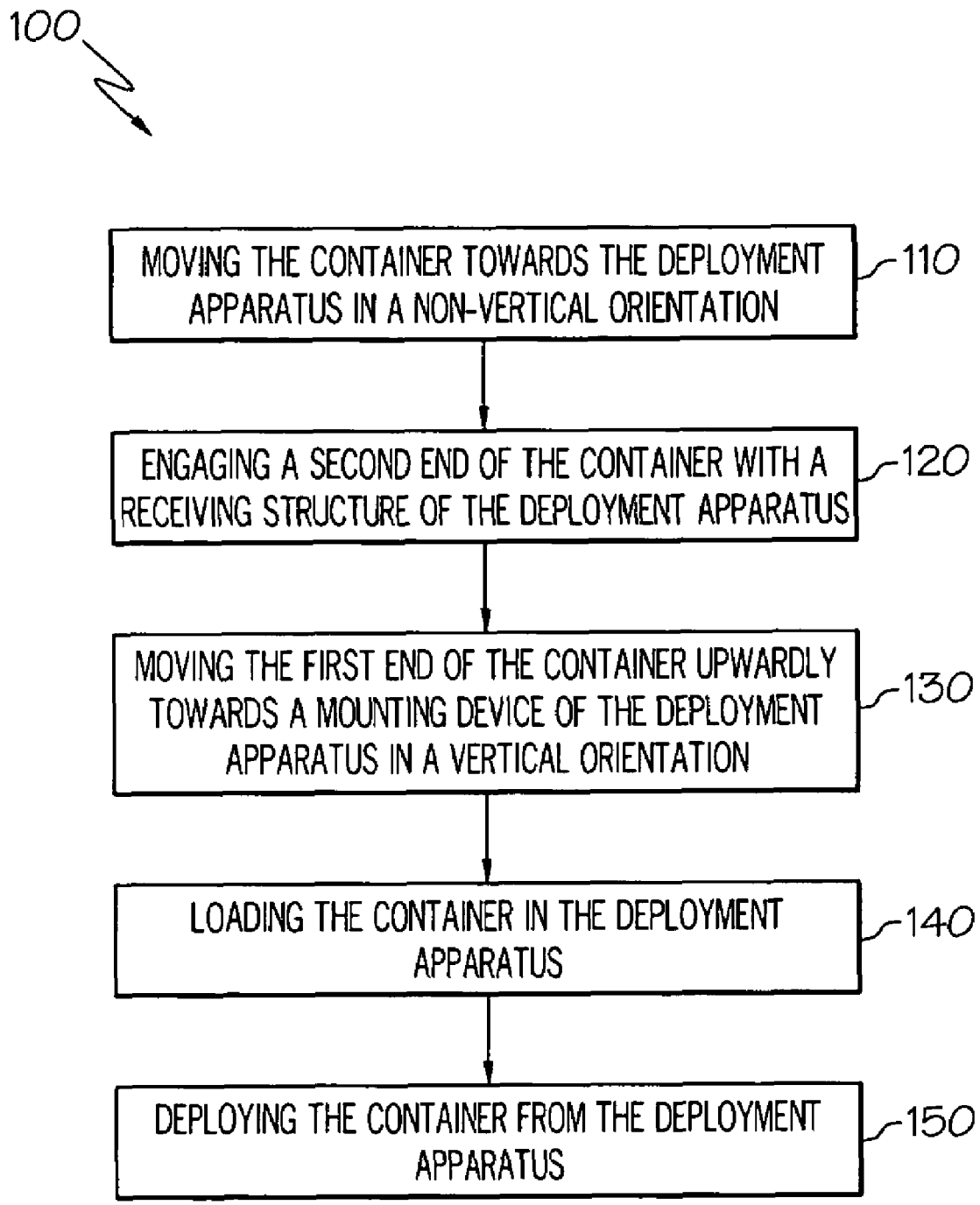
FIG. 3 is a block diagram of an exemplary method of the present invention.

FIG. 3 represents a further exemplary embodiment of a method 100 of the present invention. A first step 110 may include moving the container towards the deployment apparatus in a non-vertical orientation. A second step 120 may include engaging a second end of the container with a receiving structure of the deployment apparatus. A third step 130 may be moving the first end of the container upwardly towards a mounting device of the deployment apparatus in a vertical orientation, with the second end engaged with the receiving structure. A fourth step 140 may be operating an elevating device of the receiving structure to raise the container to a position to permit the mounting device to be engaged with the first end of the container, thereby loading the container in the deployment apparatus. A fifth step 150 may include applying pressurized gas to an interior of the container for moving the piston axially relative with respect to the container towards the second end for urging the equipment to be deployed from the second end of the container, thereby deploying the equipment from the deployment apparatus.

The features disclosed in the foregoing description, or the following claims, or the accompanying drawings, expressed in their specific forms or in terms of a means for performing the disclosed function, or a system, method or process for attaining the disclosed result, as appropriate, may, separately, or in any combination of such features, be utilized for realizing the invention in diverse forms thereof.

It should be understood, of course, that the foregoing relates to exemplary embodiments of the invention and that modifications may be made without departing from the spirit and scope of the invention as set forth in the following claims.

We claim:

1. A method of loading a container containing an item of equipment in a deployment apparatus which is operative to deploy the equipment from a flying aircraft, in which the container has a first end and a second end, the deployment apparatus including a mounting device engagable with the first end of the container, to mount the container in a generally upright depending condition with the second end being below the first end, the method including moving the container towards the deployment apparatus in a non-upright orientation, engaging the second end of the container with a receiving structure of the deployment apparatus, and with the second end engaged with the receiving structure, moving the first end of the container upwardly towards the mounting device towards a generally upright orientation, and then operating an elevating device of the receiving structure to raise the container to a position to permit the mounting device to be engaged with the first end of the container.

2. A method according to claim 1 wherein the container is moved towards the deployment apparatus for loading in the non-upright orientation, from within a fuselage of the aircraft.

3. A method according to claim 1 wherein the elevating device is manually operated.

4. A method according to claim 3 wherein the elevating device is operated by an operative's foot.

5. A method according to claim 4 wherein the elevating device includes a lever mechanism which extends from an operating position, to below a floor of the deployment apparatus, and upwardly though the floor into the receiving structure.

6. A method according claim 1 wherein the deployment apparatus is contained within a sealed envelope within a pressurized region of the aircraft.

7. A method according to claim 6 wherein the elevating device includes a lever mechanism which extends from an operating position, to below a floor of the deployment apparatus, and upwardly though the floor into the receiving structure, wherein the operating position from which the lever of the elevating device extends is external to the envelope, and wherein there is a pressure seal between the floor of the deployment apparatus and the lever mechanism, to reduce pressure loss from the pressurized region during deployment of the equipment.

8. A method according to claim 6 wherein the containers are each movable on a carousel including the respective mounting devices, from the receiving position to the loaded position, and wherein there is provided a closure at the receiving position, the method including opening the closure to permit the container or containers to be received in the apparatus, and closing the closure to seal the envelope.

9. A method according to claim 1 wherein the mounting device and the first end of the container automatically engage when the elevating device is operated to raise the container.

10. A method according to claim 1 wherein the container and the mounting device include respective first and second inter-engaging formations which are inter-engageable upon relative rotation of the raised container and mounting device to mount the container in a depending condition.

11. A method according to claim 1 wherein the container containing the equipment is moveable from a position in which the container is received in the apparatus to a loaded position ready for deployment of the equipment, the method including, after receiving the container and engaging the mounting device with the first end of the container, moving the container to the loaded position ready for deployment.

12. A method according to claim 11 wherein the deployment apparatus receives a plurality of containers with equipment, each engaged with a respective mounting device, the method including moving the containers severally from the position in which they are each received in the deployment apparatus, to the loaded position ready for deployment.

13. A method according to claim 12 wherein the containers are each movable on a carousel including the respective mounting devices, from the receiving position to the loaded position.

14. A method of loading and deploying equipment from a flying aircraft, wherein the loading step includes loading a container containing an item of equipment in a deployment apparatus which is operative to deploy the equipment from a flying aircraft, in which the container has a first end and a second end, the container including a piston which, prior to deployment, is located towards the first end of the container, the deployment apparatus including a mounting device engagable with the first end of the container, to mount the container in a generally upright depending condition with the second end being below the first end, the loading step further including moving the container towards the deployment apparatus in a non-upright orientation, engaging the second end of the container with a receiving structure of the deployment apparatus, and with the second end engaged with the receiving structure, moving the first end of the container upwardly towards the mounting device towards a generally upright orientation, and then operating an elevating device of the receiving structure to raise the container to a position to permit the mounting device to be engaged with the first end of the container, and wherein deploying the equipment from the container includes moving the piston axially of the container towards the second end to urge the equipment to be deployed from the second end of the container.

15. A method according to claim 14 which includes introducing into the container pressurized gas to move the piston.

16. A method according to claim 15 which includes, upon engaging the first end of the container with the mounting device, making a connection between the inside of the container and a source of pressurized gas via a valve.

17. A method according to claim 14 which includes stowing a storage vessel for the pressurized gas within the sealed envelope.

18. A method according to claim 14 wherein at the second end of the container there is a frangible capping which becomes at least partially detached from the remainder of the container by the equipment being urged into contact therewith by the piston.

* * * * *

UNITED STATES PATENT AND TRADEMARK OFFICE
CERTIFICATE OF CORRECTION

PATENT NO. : 7,641,148 B2
APPLICATION NO. : 11/395563
DATED : January 5, 2010
INVENTOR(S) : Zagni et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 740 days.

Signed and Sealed this

Sixteenth Day of November, 2010

David J. Kappos
*Director of the United States Patent and Trademark Office*